United States Patent [19]

Läpple et al.

[11] Patent Number: 4,536,185
[45] Date of Patent: Aug. 20, 1985

[54] LIQUID PREPARATION OF CATIONIC DYE MIXTURE CONTAINING ALIPHATIC CARBOXYLIC ACID FOR BLACK DYEING

[75] Inventors: Arnulf R. Läpple, Aesch; Alex Nicopoulos, Basel, both of Switzerland

[73] Assignee: Ciba-Geigy Corporation, Ardsley, N.Y.

[21] Appl. No.: 564,860

[22] Filed: Dec. 23, 1983

[30] Foreign Application Priority Data

Dec. 28, 1982 [CH] Switzerland ................ 7587/82

[51] Int. Cl.³ .................. C09B 67/34; D06P 1/41
[52] U.S. Cl. ............................ 8/527; 8/539;
8/639; 8/922; 8/924; 8/927
[58] Field of Search ............... 8/527, 639, 539

[56] References Cited

U.S. PATENT DOCUMENTS

| | | | |
|---|---|---|---|
| 3,942,946 | 3/1976 | Okaniwa et al. | 8/539 |
| 3,948,598 | 4/1976 | Okaniwa et al. | 8/539 |
| 4,508,536 | 4/1985 | Erzinger | 8/639 |

FOREIGN PATENT DOCUMENTS

| | | |
|---|---|---|
| 56947 | 8/1982 | European Pat. Off. |
| 2428663 | 2/1980 | France . |
| 50-145680 | 11/1975 | Japan . |
| 52-33717 | 8/1977 | Japan . |

*Primary Examiner*—A. Lionel Clingman
*Attorney, Agent, or Firm*—Edward Robert McC.; Kevin T. Mansfield

[57] ABSTRACT

A novel liquid preparation containing a mixture of dyes according to claim 1, an aliphatic carboxylic acid, and optionally water and organic solvents. This novel preparation is storage-stable and temperature-stable and can be used in particular for dyeing polyacrylonitrile materials in black shades, the dyeings obtained having a neutral shade, negligible change of shade in artificial light and very good fastness to light.

7 Claims, No Drawings

LIQUID PREPARATION OF CATIONIC DYE MIXTURE CONTAINING ALIPHATIC CARBOXYLIC ACID FOR BLACK DYEING

The invention relates to a liquid preparation of cationic dyes, to processes for producing it, and to the use of the preparation for dyeing and printing especially polyacrylonitrile materials.

Black mixtures of cationic dyes are known. For the adjustment of their shades, these mixtures contain in particular basic dyes, such as malachite green and/or fuchsin, and optionally also chrysoidine and/or auramine. The disadvantage of these mixtures is that, among other things, the individual components in the mixture can unfavourably influence each other to the extent that it is possible for precipitation to occur.

From the European Patent Application No. 56 947, there are known solid dye mixtures formed from three cationic dyes, which mixtures can be used for dyeing in black shades synthetic fibres modified by acid groups. The disadvantages of solid preparations (for example the release of dust during weighing, the time-consuming dissolving process, and so forth) are commonly known.

There has now been found a liquid preparation of cationic dyes containing in its preferred embodiment a mixture of three cationic azo and/or hydrazone dyes, which preparation surprisingly does not have the aforementioned disadvantages in that, inter alia, it remains stable and in that the individual dyes of the mixture do not unfavourably affect one another by, for example, precipitating, the said preparation being thus excellently suitable for dyeing synthetic fibres modified by acid groups. Furthermore, it is of advantage that the liquid preparation of the present invention can be added directly to the dye bath.

The invention relates therefore to a novel liquid preparation of cationic dyes containing, in addition to the cationic dyes, an aliphatic carboxylic acid, optionally water, organic solvents and other additives, which preparation contains, as cationic dyes, a mixture of at least one cationic yellow component of the formulae

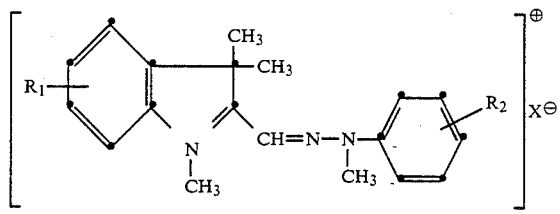

and/or

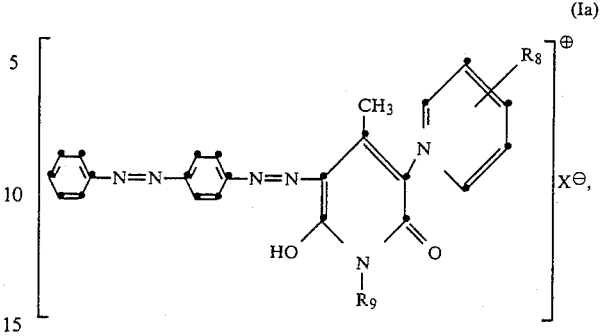

at least one cationic red component of the formulae

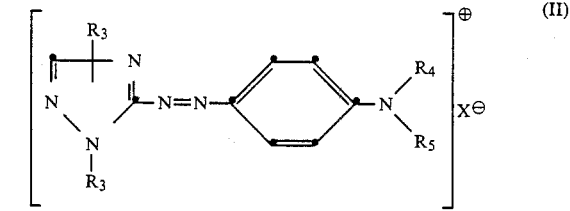

and/or

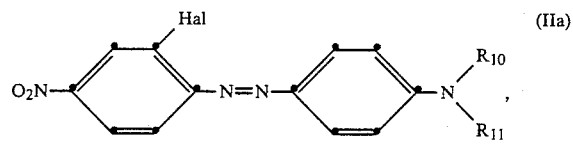

and at least one cationic blue component of the formulae

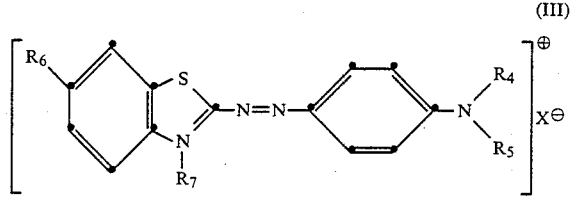

and/or

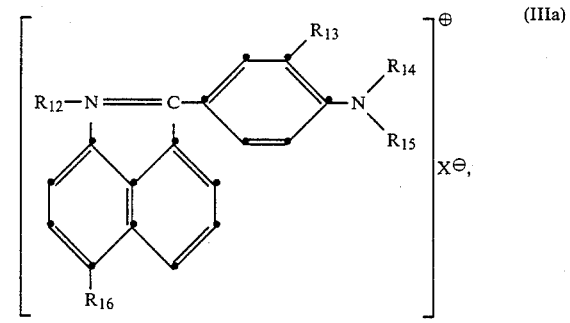

and/or

-continued

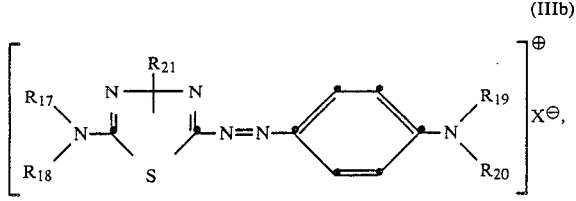

(IIIb)

in which formulae $R_1$ and $R_2$ independently of one another are each hydrogen, halogen, $C_1$–$C_4$-alkyl or $C_1$–$C_4$-alkoxy, $R_3$ is $C_1$–$C_4$-alkyl, $R_4$ and $R_5$ independently of one another are each unsubstituted or substituted $C_1$–$C_4$-alkyl, $R_6$ is $C_1$–$C_4$-alkoxy or acylamino, $R_7$ is $C_1$–$C_4$-alkyl, $R_8$ is hydrogen or methyl, $R_9$ is hydrogen, unsubstituted or substituted $C_1$–$C_6$-alkyl, or is phenyl or cyclohexyl, Hal is chlorine or bromine, $R_{10}$ is $C_1$–$C_4$-alkyl, $R_{11}$ is a radical of any one of the formulae

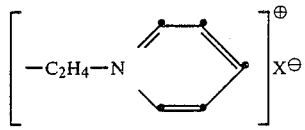

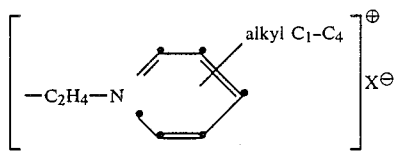

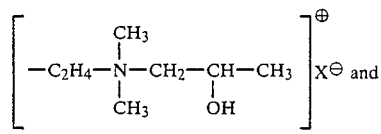

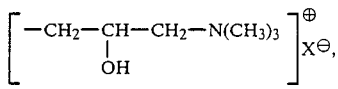

$R_{12}$ is $C_1$–$C_4$-alkyl, $R_{13}$ is hydrogen, $C_1$–$C_4$-alkyl or $C_1$–$C_4$-alkoxy, $R_{14}$ is hydrogen, $C_1$–$C_4$-alkyl or phenyl, $R_{15}$ is unsubstituted or substituted $C_1$–$C_4$-alkyl, $R_{16}$ is hydrogen or halogen, $R_{17}$, $R_{18}$, $R_{19}$ and $R_{20}$ independently of one another are each unsubstituted or substituted $C_1$–$C_6$-alkyl, or $R_{17}$ forms with $R_{18}$, with inclusion of the N atom and optionally further hetero atoms, a heterocyclic 5- or 6-membered ring, $R_{21}$ is unsubstituted or substituted $C_1$–$C_3$-alkyl, and X is an anionic radical.

The dyes of the given formulae are known.

A preferred liquid preparation contains for example all together 20–30% by weight of cationic dyes, being composed in particular of 10–12% by weight of the yellow component(s), 4–6% by weight of the red component(s) and 6–12% by weight of the blue component(s).

As halogen, $R_1$, $R_2$ and $R_{16}$ are for example the fluorine, chlorine or bromine atom.

When $R_1$, $R_2$, $R_3$, $R_4$, $R_5$, $R_6$, $R_7$, $R_9$, $R_{10}$, $R_{12}$, $R_{13}$, $R_{14}$, $R_{19}$ and $R_{20}$ are a $C_1$–$C_4$ alkyl, $C_1$–$C_6$-alkyl or $C_1$–$C_4$-alkoxy group, this is a straight-chain or branched-chain group, for example: the methyl, ethyl, n-propyl, n-butyl, iso-butyl, tert-butyl, methoxy, ethoxy, n-propoxy or isobutoxy group. In the case of $R_4$, $R_5$, $R_9$, $R_{19}$ and $R_{20}$, the $C_1$–$C_4$- or $C_1$–$C_6$-alkyl group can be further substituted; substituents can be for example the hydroxyl and phenyl groups. And in the case of $R_{15}$, the $C_1$–$C_4$-alkyl group can be further substituted, for example by OH, halogen and $C_1$–$C_4$-alkoxy.

When $R_{17}$ and $R_{18}$ together form a heterocycle, this is in particular a morpholine or piperazine ring.

In this connection, there are for $R_4$ and $R_5$ the following advantageous combinations: $R_4$=unsubstituted $C_1$–$C_4$-alkyl and $R_5$=substituted $C_1$–$C_4$-alkyl; and also $R_4$ and $R_5$=substituted $C_1$–$C_4$-alkyl.

If $R_6$ is an acylamino group, it can be a benzoylamino group or preferably an acetylamino group.

When the $C_1$–$C_3$-alkyl group denoted by $R_{21}$ is substituted, the substituent is in particular OH.

Preferred preparations contain as yellow component a dye of the formula I wherein: $R_1$ is hydrogen, $R_2$ is a $C_1$–$C_4$-alkoxy group, and X is an anionic radical; as red component a dye of the formula II wherein: $R_3$ is the methyl group, $R_4$ is the methyl or ethyl group, $R_5$ is a methyl or ethyl group each substituted by phenyl, and X is an anionic radical; and as blue component a dye of the formula III wherein: $R_4$ is the methyl or ethyl group, $R_5$ is a methyl, ethyl or propyl group each substituted by hydroxyl, $R_6$ is the methoxy group, $R_7$ the methyl or ethyl group, and X is an anion.

Anions X can be both inorganic and organic anions, for example: halogen, such as fluoride, chloride, bromide or iodide ions, also boron tetrafluoride, sulfate, methyl sulfate, aminosulfonate, perchlorate, carbonate, bicarbonate, phosphate, phosphomolybdate, phosphotungstate, phosphotunstomolybdate, benzenesulfonate, naphthalenesulfonate, 4-chlorobenzenesulfonate, oxalate, maleinate, formiate, acetate, propionate, lactate, succinate, chloroacetate, tartrate, methanesulfonate or benzoate ions, or complex anions, such as that of zinc chloride double salts.

Preferred anions X are the acetate, methylsulfate, lactate and formiate ions.

In the novel preparations, the yellow, red and blue dyes can consist each of a single component or alternatively of a mixture of components of identical or similar shade. When the dye consists of a mixture of components, this has the advantage that certain properties of a dye can be varied by the addition of a further dye of the same or similar shade.

The novel liquid preparations contain, besides the dye mixture as defined, aliphatic, saturated and unsaturated mono- or dicarboxylic acids; and these have to be capable of holding the defined dye mixture in solution. Examples which may be mentioned are: formic acid, acetic acid, propionic acid, lactic acid, oleic acid, linoleic acid, oxalic acid, tartaric acid and malonic acid. Preferred acids are lactic acid and especially acetic acid.

These carboxylic acids are present in the liquid preparation preferably to the extent of 10–30% by weight, especially 12–25% by weight.

The novel liquid preparations can in addition contain water or a mixture of water and water-soluble organic solvents, or just organic solvents. Suitable organic solvents in this connection are for example: glycols, such as ethylene glycol, diethylene glycol or triethylene glycol; glycol ethers, such as ethylene glycol monomethyl ether, ethylene glycol monoethyl ether, diethylene glycol monomethyl ether, diethylene glycol monoethyl ether and diethylene glycol mono-n-butyl ether; also dimethyl sulfoxide, N-methylpyrrolidone, dimethylformamide, tetramethylurea, δ-caprolactam and benzyl alcohol.

The novel liquid preparations can contain further customary additives, such as emulsifiers, dispersing agents, levelling agents and/or wetting agents.

The novel dye preparations are stable liquid formulations, both storage-stable (min. of 6 months in the form of a true solution, without sedimentation occurring) and temperature-stable (from about 0° to 30° C.); they have a high concentration of dye, are highly fluid, therefore readily pourable, and they do not gel.

The novel liquid preparations are produced for example by stirring together at room temperature low-salt, optionally aqueous solutions of the yellow, red and blue component(s), which solutions contain aliphatic carboxylic acids, and adding, if required, further additives and/or organic solvents before, during or after the stirring operation.

The novel liquid dye preparations are ready for use directly without dilution, and can be employed for dyeing and printing textile materials dyeable with cationic dyes, particularly textile materials which consist for example advantageously of homo- or copolymers of acrylonitrile, or polyesters which are modified by acidic groups. Dyeing is preferably performed in an aqueous, slightly acid medium by the exhaust process or by the pad-steam process. The textile material can be in the widest variety of make-up forms, for example it can be in the form of tow, slubbing, loose fibres, yarn, filaments, fabrics, knitted articles, piece goods and finished garments, such as shirts and pullovers.

In addition, the novel preparations can be used for dyeing polyacrylonitrile wet tow, and likewise for dyeing the polyacrylonitrile constituent in mixed fabrics, for example mixed fabrics made from polyacrylonitrile and cellulose, polyacrylonitrile and wool, polyacrylonitrile and polyamide, polyacrylonitrile and polyester as well as polyacrylonitrile and polyacrylonitrile which is acid dyeable.

A further advantage of the novel liquid preparation is that this can be used as a filler component; the preparation can be combined with liquid and pulverulent cationic coloured dyes, and can thus be used as a shading component. This opens up the novel possibility of being able to produce economically dull shades on polyacrylonitrile. It is possible for example for each liquid preparation containing the individual dye I, II or III of the liquid formulation according to the invention to be shaded with the novel liquid preparation containing for example the mixture of the dyes I, II and III. When for example the liquid formulation containing just the yellow dye I is shaded with the novel preparation, the most varied olive shades can be obtained; when the liquid formulation containing just the red dye II is shaded with the novel preparation, the most varied ruby to claret shades can be obtained; and when the liquid formulation containing on its own the blue dye III is shaded with the novel preparation, the most varied blue shades can be obtained.

The textile materials dyed with the novel liquid preparations have very good properties and performance characteristics. In this respect, mention is made in particular of the neutral shade, the negligible change of shade in artificial light, the very good fastness to light in all depths of shade (from light grey to deep black) and the good build-up properties.

The following Examples further illustrate the invention without its scope being limited to them. The term 'parts' denotes parts by weight.

EXAMPLE 1

A liquid preparation is produced as follows:
Into a 600 ml beaker are placed successively:
300.0 g of the liquid formulation A
111.5 g of the liquid formulation B, and
60.0 g of the liquid formulation C.

The mixture is then homogenised by means of a magnetic stirrer for one hour at room temperature (pH=about 3.3). There are subsequently added 2.5 g of an emulsifier (fatty alcohol polyglycol ether base), and stirring is continued for a further hour. The dye solution obtained is made up with about 27 g of water to 500 g; it is afterwards filtered until clear to thus obtain a black liquid preparation having the following composition:

8.7 parts of the dye of the formula

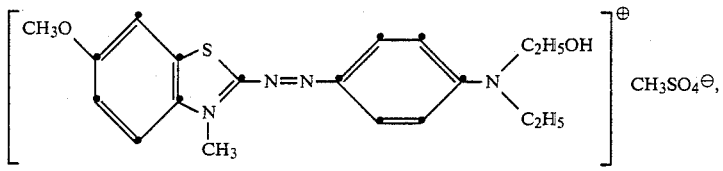

11.4 parts of the dye of the formula

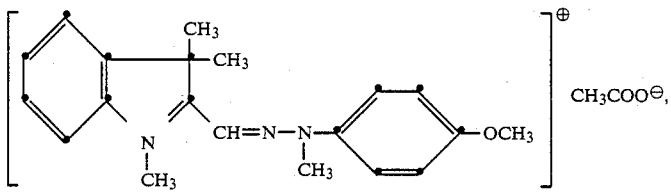

4.7 parts of the dye of the formula

-continued

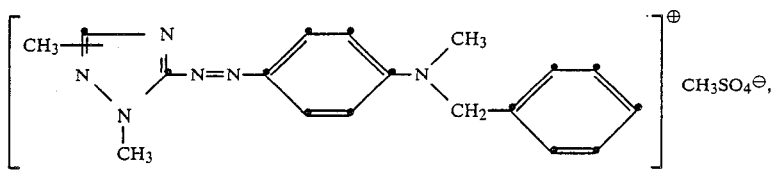

19.0 parts of acetic acid,
55.1 parts of water, and
1.1 parts of fatty alcohol polyglycol ether
100  parts.

Liquid formulation A 14.5% by weight of the dye of the formula

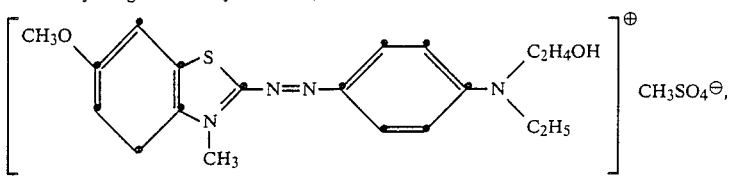

15.0% by weight of acetic acid,
1.0% by weight of magnesium-hydrogen-methyl sulfate,
1.2% by weight of sodium acetate,
1.0% by weight of fatty alcohol polyglycol ether, and
67.3% by weight of water
100.0% by weight.

Liquid formulation B

Containing the dye of the formula

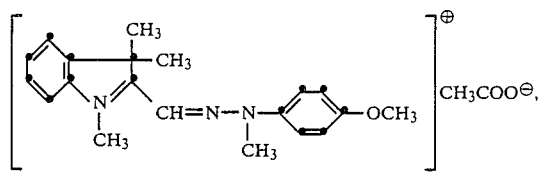

acetic acid and water.

Liquid formulation C 40.0% by weight of the dye of the formula

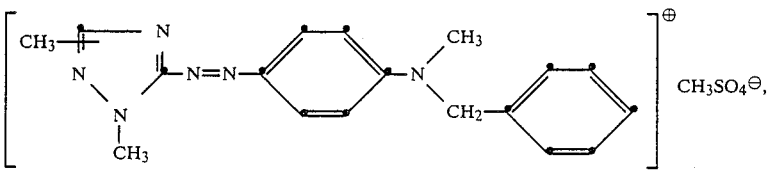

28.5% by weight of water,
1.5% by weight of $Na_2SO_4$, and
30.0% by weight of acetic acid
100.0% by weight.

EXAMPLE 2

83 kg of continuously pretextured Euroacril (polyacrylonitrile) high-bulk yarn as wound packages are dyed with a ratio of goods to liquor of 1:15 in a Henriksen circulation dyeing machine. The aqueous dye liquor contains 0.5% of an aqueous solution of an alkylphenolethoxylate, 1% of cryst. sodium acetate and 4% (=3320 g) of a liquid preparation according to Example 1. The pH value is adjusted to 4–4.5 with acetic acid, and the material to be dyed is introduced at 70° C. and treated for 5 minutes with the liquor circulation being from the inside to the outside. The liquor is subsequently heated within 30 minutes to 100° C., and dyeing is performed for 60 minutes at this temperature. The liquor is then cooled to 50° C., and the material is rinsed, centrifuged and dried. A Euroacril yarn levelly dyed in a deep black shade is obtained.

EXAMPLE 3

105 kg of Dralon (polyacrylonitrile) weaving yarn on cheeses are to be dyed in a Then cheese-dyeing machine containing an aqueous dye liquor (about 1200 l) consisting of 0.5% of an aqueous solution of an alkylphenolethoxylate, 1% of crystallised sodium acetate, 5% of calcined Glauber's salt and 1% (=1050 g) of a liquid preparation according to Example 1, as well as 1% of an aqueous solution of dodecyldimethylbenzylammonium chloride, the pH-value being adjusted to 4–4.5 with acetic acid. The yarn is introduced at 75° C. and treated for 5 minutes with the circulation of liquor being from the inside to the outside. The dye bath is then heated within 45 minutes to 100° C., and dyeing is performed at this temperature for 60 minutes. The bath is subsequently cooled, and the material is rinsed, centrifuged and dried. The result is a Dralon yarn levelly dyed in a neutral-grey shade having a fastness to light greatly superior to that obtainable by the use of customary brands of black dyes.

EXAMPLE 4

62 kg of Dolan (polyacrylonitrile) weaving yarn on cheeses are to be dyed in a Scholl cheese-dyeing machine containing an aqueous dye liquor (about 750 l) consisting of 0.5% of an aqueous solution of an alkylphenolethoxylate, 1% of crystallised sodium acetate, and 620 g of a dye mixture comprising 496 g of the dye of the formula

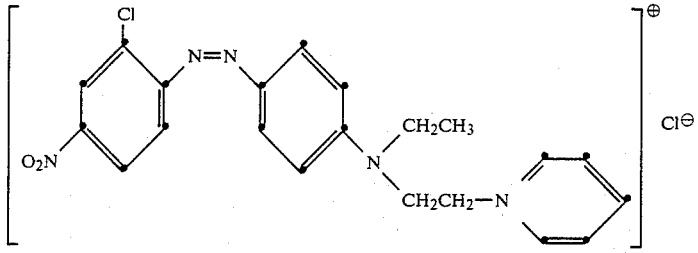

as a liquid preparation and 124 g of a liquid preparation according to Example 1, as well as 1% of an aqueous solution of dodecyldimethylbenzylammonium chloride, the pH-value being adjusted to 4-4.5 with acetic acid. The yarn is introduced at 75° C. and treated for 10 minutes with the circulation of liquor being from the inside to the outside. The dye bath is then heated within 45 minutes to 100° C., and dyeing is performed for 60 minutes at this temperature. The liquor is subsequently cooled, and the material is rinsed, centrifuged and dried. A Dolan yarn levelly dyed in a brown shade distinguished by very good fastness to light is obtained.

EXAMPLE 5

1500 kg of Cashmilon (polyacrylonitrile) tow are continuously dyed by the pad-steam process, the tow being firstly impregnated, on a padding machine, with an aqueous padding liquor at 30° C. consisting of the following composition per liter:
6 g of an acid-resistant thickening agent (carob bean flour derivative type)
20 g of coconut oil fatty acid diethanolamide,
0.05 g of antifoam agent, and
40 g of a liquid preparation according to Example 1.

The pH-value is adjusted to 4-4.5 with tartaric acid, and the liquor absorption is 100%. The material is then steamed in an Ilma steamer for 45 minutes with saturated steam at 100°-102° C. The material is subsequently rinsed in a back-washing machine (Lisseuse), washed and brightened; it is afterwards dried and wound off into cans. There is thus obtained a tow which is levelly dyed in a deep black shade, and which in the willowed condition can be processed together with undyed tow without staining this during subsequent steaming.

EXAMPLE 6

500 kg of Velicren (polyacrylonitrile) slubbing are printed by the vigoureux printing process on a suitable apparatus with a degree of coverage of 25%. The aqueous printing paste contains per liter:
8 g of an acid resistant thickening agent (carob bean flour derivative type),
6 g of coconut oil fatty acid diethanolamide,
1.5 g of a deaerating agent, and
40 g of a liquid preparation according to Example 1;
pH 4-4.5 with tartaric acid.

The material is subsequently steamed on a steamer for 45 minutes with saturated steam at 100°-102° C.; it is afterwards washed, brightened and dried. There is obtained on the slubbing an even, deep black printing of sharp outline and with good penetration. A staining of the unprinted sections during steaming does not occur.

EXAMPLE 7

300 kg of stretched polyacylonitrile wet tow having an individual fibril titer of 3.3 dtex are continuously dyed on a suitable dyeing apparatus. The dye liquor at 50° C. contains per liter 20 g of a liquid preparation according to Example 1; the pH-value is 4, and the immersion time for the tow is 3 seconds. The continuous dosing to maintain a constant concentration of dye in the dye liquor is 200 ml/min., which corresponds to the desired depth of colour of a 4% black mixture. The material is squeezed out after treatment in the dye bath. The tow passes through dwell and steaming sections before being rinsed, brightened and dried. There is obtained a tow which is dyed in a level deep black shade and which leaves the rinsing and brightening baths virtually unstained.

EXAMPLE 8

When the procedure is carried out in a manner analogous to that described in Example 1, it is possible to obtain, by the suitable mixing of solutions of the dyes shown in the following Table, black liquid preparations having the given compositions:

TABLE

| Dye | Variant: | A | B | C | D | E | F | G | H | I |
|---|---|---|---|---|---|---|---|---|---|---|
| I' | parts | 11.2 | — | 7.8 | 11.3 | — | — | 5.7 | 11.4 | 8.8 |
| I'a | parts | — | 7.4 | — | — | 4.8 | 4.4 | 3.6 | — | — |
| II' | parts | 5.7 | 6.0 | — | 4.7 | — | — | 6.1 | 5.5 | — |
| II'a | parts | — | — | 5.2 | — | 5.4 | 7.0 | — | — | 4.7 |
| III' | parts | — | 9.9 | — | — | — | 9.9 | 9.9 | 5.0 | — |
| III'a | parts | — | — | — | 29.0 | — | — | — | 14.5 | 29.0 |
| III'b | parts | 28.8 | — | 29.9 | — | 28.8 | — | — | — | — |
| 80% acetic acid | parts | 19.0 | 19.0 | 19.0 | 19.0 | 19.0 | 19.0 | 19.0 | 19.0 | 19.0 |

TABLE-continued
| Dye | Variant: | A | B | C | D | E | F | G | H | I |
|---|---|---|---|---|---|---|---|---|---|---|
| fatty alcohol poly-glycol ether | parts | 1.1 | 1.1 | 1.1 | 1.1 | 1.1 | 1.1 | 1.1 | 1.1 | 1.1 |
| water | parts | 34.2 | 56.6 | 37.0 | 34.9 | 40.9 | 58.6 | 54.6 | 43.5 | 37.4 |
dye I'
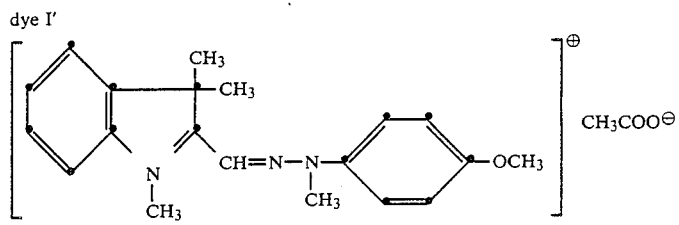
dye II'
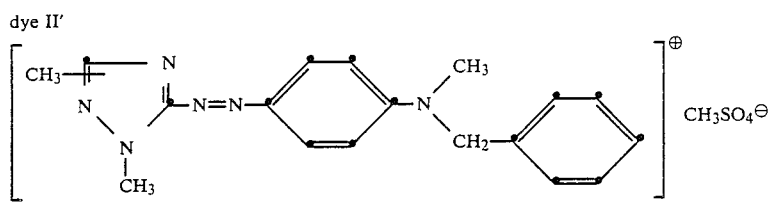
dye III'
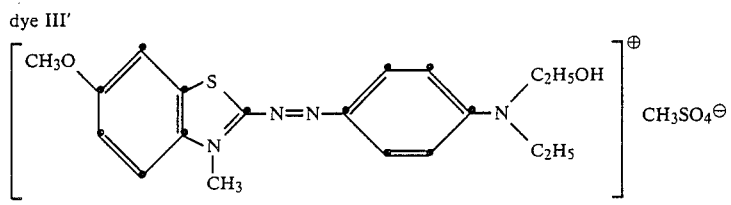
dye I'
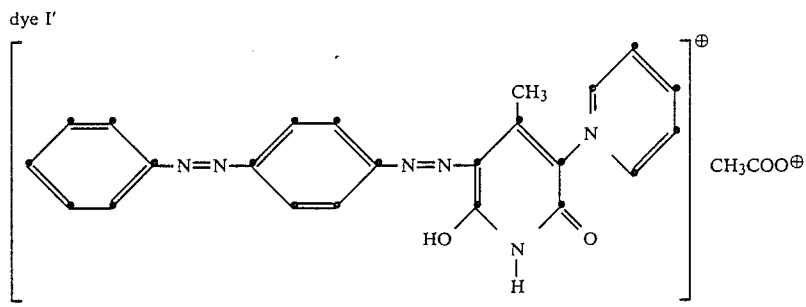
dye II'a
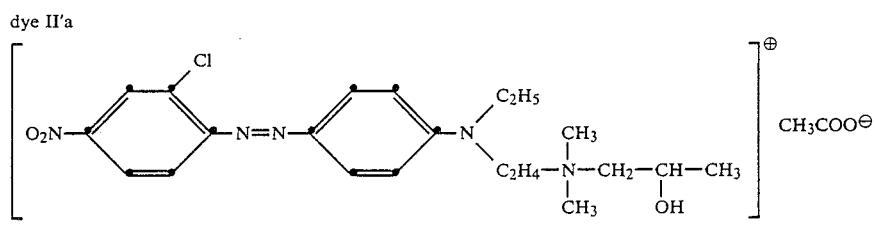
dye III'a
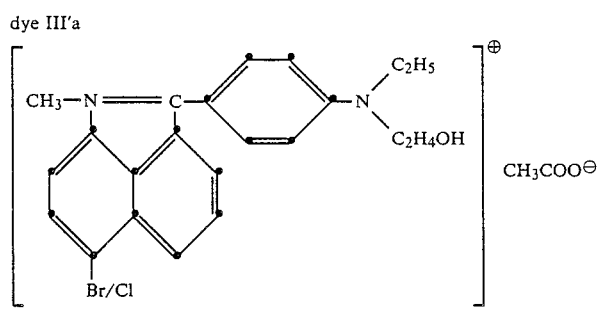

TABLE-continued

| Dye | Variant: | A | B | C | D | E | F | G | H | I |
|---|---|---|---|---|---|---|---|---|---|---|
| dye III'b | | | | | | | | | | |

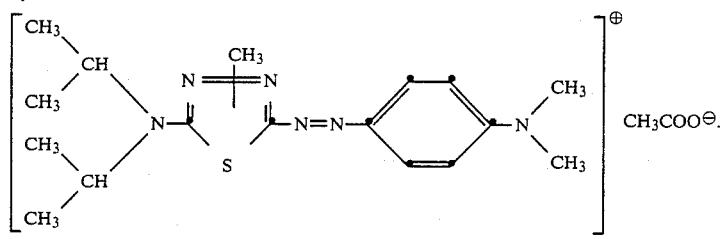

EXAMPLE 9

75 kg of Acrilan (polyacrylonitrile) carpet yarn in hank form are to be dyed in a Krantz circulation dyeing apparatus containing an aqueous dye liquor (about 2500 l) consisting of 0.5% of an aqueous solution of an alkylphenolethoxylate, 1% of crystallised sodium acetate, 5% of calcined Glauber's salt and 1.5% (=1125 g) of a liquid dye preparation according to Example 8, variant H in the Table, as well as 0.8% of an aqueous solution of dodecyldimethylbenzylammonium chloride, the pH-value being adjusted to 4–4.5 with acetic acid. The yarn is introduced at 80° C., and the dye bath is heated, with an alternating liquor circulation, in the course of 30 minutes to 100° C., and dyeing is performed for 1 hour at this temperature. The dye bath is subsequently cooled, and the material is rinsed, centrifuged and dried. A yarn levelly dyed in a grey shade is obtained. The very good fastness to light is better than that obtained with use solely of dye III'a instead of the mixture of the dyes III', III'a and III'b.

EXAMPLE 10

In a manner analogous to that of Example 5, 1500 kg of Cashmilon (polyacrylonitrile) tow are dyed in a dark grey shade, an amount per liter of 25 g of the liquid dye preparation according to Example 8, variant C, of the Table being used. A dyeing having very good stability to steaming is obtained.

EXAMPLE 11

A liquid preparation is produced as follows:
Into a 600 ml beaker are introduced successively:
198.0 g of the liquid formulation $A_1$,
111.5 g of the liquid formulation B (according to Example 1),
67.5 g of the liquid formulation $C_1$.

35 g of 100% acetic acid are then added to the mixture, and the whole is homogenised, by means of a magnetic stirrer, for 1 hour at room temperature (pH=about 3.3). There are subsequently added 2.5 g of an emulsifier (based on fatty alcohol polyglycol ether), and the mixture is stirred for a further hour. The dye solution obtained is made up with water (85.5 g) to 500 g, and afterwards filtered until clear. The resulting black liquid preparation has the following composition:

8.7 parts of the dye of the formula

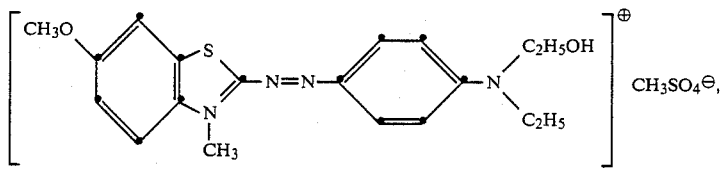

8.9 parts of the dye of the formula

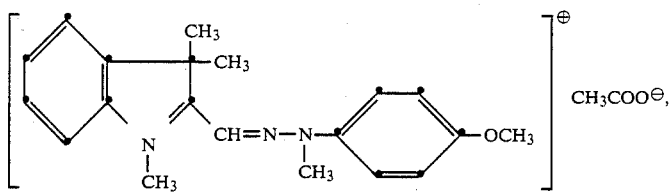

4.5 parts of the dye of the formula

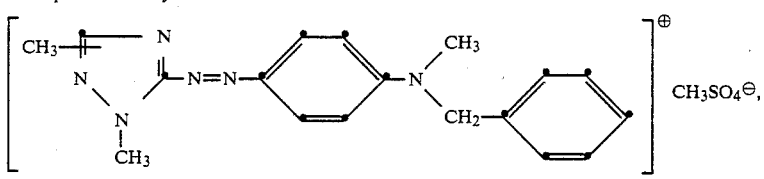

29.0 parts of acetic acid,
1.5 parts of $Na_2SO_4$ + MgH $CH_3$ $SO_4$,
45.4 parts of water, 1.0 part of CH$_3$COONa, and
1.0 part of fatty alcohol polyglycol ether,
100.0 parts Liquid formulation A$_1$ 21.9% by weight of the dye of the formula

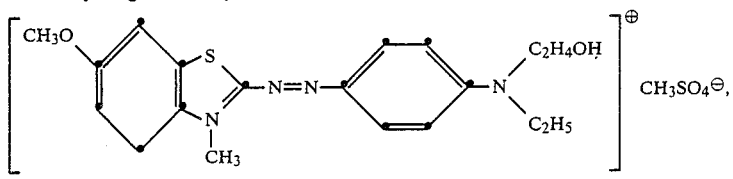

29.0% by weight of acetic acid,
1.5% by weight of magnesium hydrogen methyl sulfate,
2.0% by weight of sodium acetate,
1.0% by weight of fatty alcohol polyglycol ether, and
44.6% by weight of water,
100.0% by weight.

Liquid formulation C$_1$ 33.6% by weight of the dye of the formula

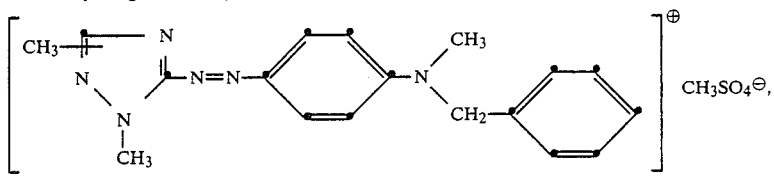

33.9% by weight of water,
1.5% by weight of Na$_2$SO$_4$ + MgH CH$_3$SO$_4$,
30.0% by weight of acetic acid
100.0% by weight.

What is claimed is:

1. A black liquid dye preparation consisting essentially of a cationic yellow component of the formula

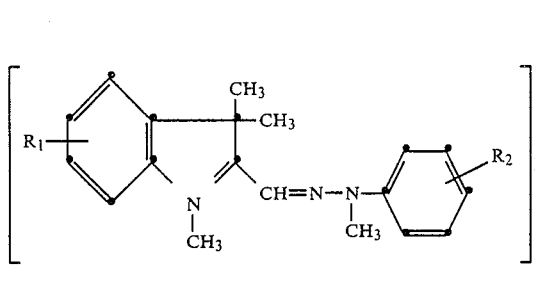

or

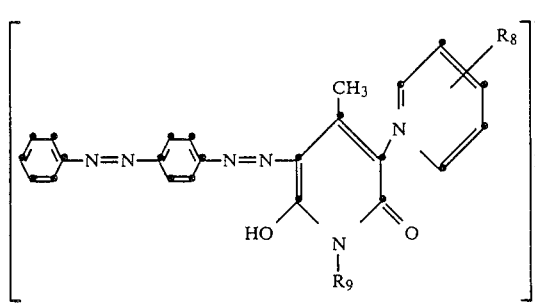

a cationic red component of the formula

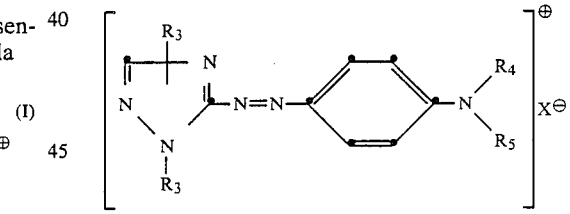

or

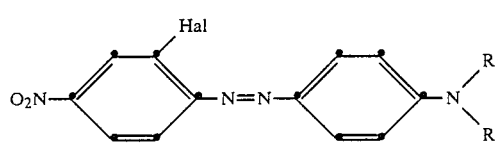

and a cationic blue component of the formula

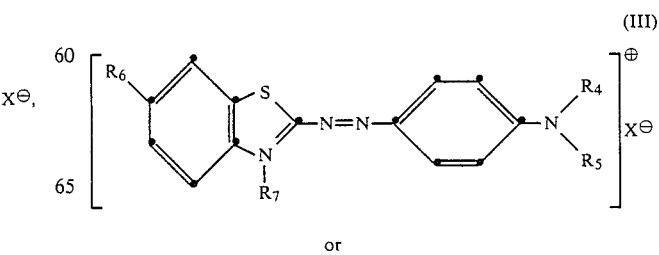

or

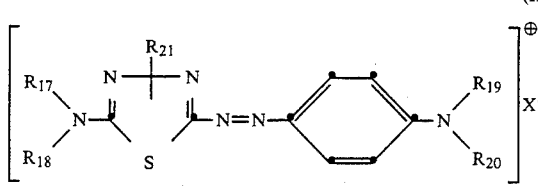

and an aliphatic mono- or di-carboxylic acid, wherein
$R_1$ and $R_2$ independently of one another are each hydrogen, halogen, $C_1$-$C_4$-alkyl or $C_1$-$C_4$-alkoxy,
$R_3$ is $C_1$-$C_4$-alkyl,
$R_4$ and $R_5$ independently of one another are each unsubstituted or substituted $C_1$-$C_4$-alkyl,
$R_6$ is $C_1$-$C_4$-alkoxy or acylamino,
$R_7$ is $C_1$-$C_4$-alkyl,
$R_8$ is hydrogen or methyl,
$R_9$ is hydrogen, unsubstituted or substituted $C_1$-$C_6$-alkyl, or is phenyl or cyclohexyl,
Hal is chlorine or bromine,
$R_{10}$ is $C_1$-$C_4$-alkyl,
$R_{11}$ is a radical of any one of the formulae

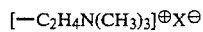

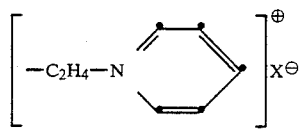

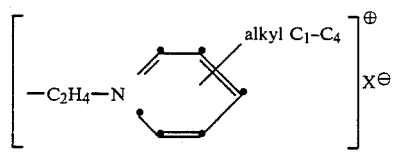

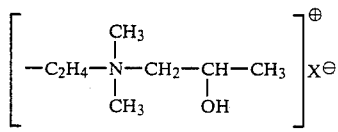

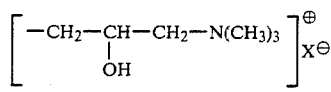

$R_{12}$ is $C_1$-$C_4$-alkyl,
$R_{13}$ is hydrogen, $C_1$-$C_4$-alkyl or $C_1$-$C_4$-alkoxy,
$R_{14}$ is hydrogen, $C_1$-$C_4$-alkyl or Phenyl,
$R_{15}$ is unsubstituted or substituted $C_1$-$C_4$-alkyl,
$R_{16}$ is hydrogen or halogen,
$R_{17}$, $R_{18}$, $R_{19}$ and $R_{20}$ independently of one another are each unsubstituted or substituted $C_1$-$C_6$-alkyl, or $R_{17}$ forms with $R_{18}$, with inclusion of the N atom and optically further hetero atoms, a heterocyclic 5- or 6-membered ring,
$R_{21}$ is unsubstituted or substituted $C_1$-$C_3$-alkyl,
X is an anionic radical,
and optionally water, organic solvents and conventional additives.

2. A liquid preparation of claim 1, which contains as yellow component a dye of the formula I wherein: $R_1$ is hydrogen, $R_2$ is a $C_1$-$C_4$-alkoxy group, and X is an anionic radical; as red component a dye of the formula II wherein: $R_3$ is the methyl group, $R_4$ is the methyl or ethyl group, $R_5$ is a methyl or ethyl group each substituted by phenyl, and X is an anionic radical; and as blue component a dye of the formula III wherein: $R_4$ is the methyl or ethyl group, $R_5$ is a methyl, ethyl or propyl group each substituted by hydroxyl, $R_6$ is the methoxy group, $R_7$ is the methyl or ethyl group, and X is an anion.

3. A liquid preparation of claim 1, which contains all together 20–30% by weight of dye.

4. A liquid preparation of claim 1, which contains 10–12% by weight of the yellow component(s), 4–6% by weight of the red component(s) and 6–12% by weight of the blue component(s).

5. A liquid preparation of claim 1, wherein the anion X is an acetate, methylsulfate, lactate or formiate ion.

6. A process for producing the liquid preparation according to claim 1, which process comprises mixing together at room temperature aqueous solutions of the yellow, red and blue component(s), which solutions contain aliphatic mono- or di-carboxylic acids, and adding, if required, further additives and/or organic solvents before, during or after the stirring operation.

7. A method of dyeing or printing polyacrylonitrile fiber or polyester or polyamide fiber modified by acid groups, which process comprises applying to said fibers a preparation of claim 1.

* * * * *